Patented May 15, 1928.

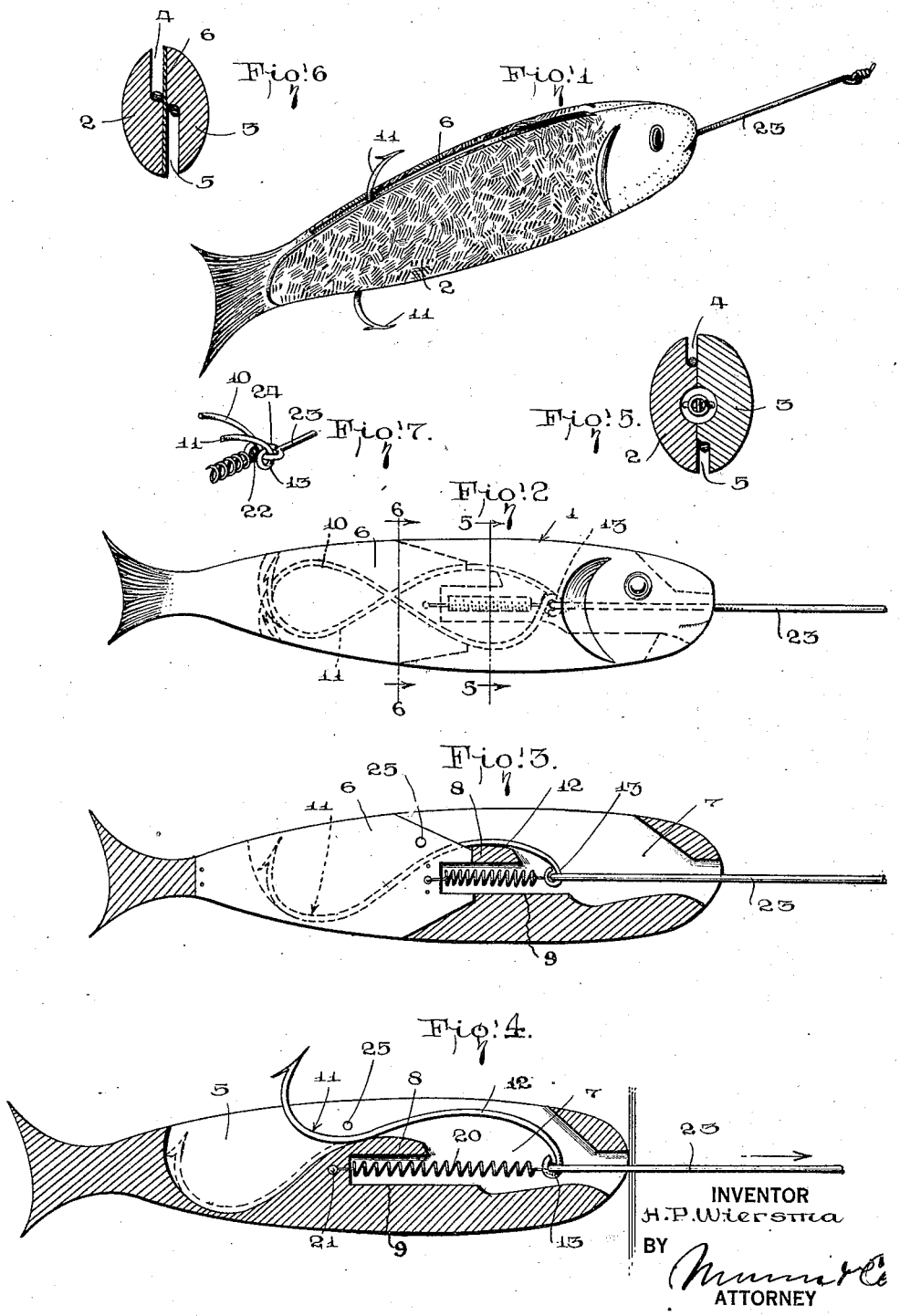

1,670,174

UNITED STATES PATENT OFFICE.

HENRY P. WIERSMA, OF ZEELAND, MICHIGAN.

ARTIFICIAL BAIT.

Application filed January 18, 1927. Serial No. 161,881.

This invention relates to artificial bait or lures and more particularly to the type of weedless baits constructed to prevent the hook or hooks from engaging weeds as it is being drawn through the water in casting or trolling.

A primary object of the invention is to so construct a bait of this character that if when casting should the tension of the line be sufficient to cause the hook or hooks to be projected, when the reaction occurs incident to the bait lighting on the water, the hook or hooks will slide back into housed position within the bait.

Another object is to so mount a hook within the bait and connect it with the line in such a manner that should the body of the bait be crushed or broken by the grasp of the fish a direct hold on the hook would still be retained enabling the fish to be taken.

Still another object is to so construct a bait of this character that the resistance of the spring, which is employed to withdraw the hook into the body of the bait, will be exerted in a direction opposite to the tension of the line.

Another object is to construct such a bait so that no springs are required for projecting the hook but when the bait is struck by a fish the hook will slide out under the tension of the line.

In carrying out these objects, the invention is susceptible of a wide range of modification without departing from the spirit or sacrificing any of the advantages of the claimed invention; there being shown in the drawings for illustrative purposes certain preferred and practical forms, in which:—

Figure 1 represents a perspective view of a bait embodying this invention made in the form of a small fish and employing two hooks; the hooks being shown projected, Figure 2 is a side elevation thereof with the hooks shown housed and the interior illustrated in dotted lines.

Figure 3 is a longitudinal section thereof showing the hook in retracted position;

Figure 4 is a similar view showing the hook projected in full lines and housed in dotted lines;

Figure 5 is a transverse section taken on the line 5—5 of Fig. 2;

Figure 6 is a similar view taken on the line 6—6 of Fig. 2; and

Figure 7 is a detail perspective view showing the connection of the hooks with the spring and line.

In the embodiment illustrated the bait is shown in the form of a small fish, although obviously it may be of any other desired configuration. This bait comprises a body 1 formed of two sections 2 and 3 connected in any suitable manner and cut away on their inner faces near one end to provide hook receiving chambers 4 and 5 which open through the upper and lower edges of the body to provide for the projection and retraction of the hooks 10 and 11 which when projected face toward the head of the bait as shown in Fig. 1. The shanks 12 of these hooks are curved longitudinally (see Fig. 4) and each has an eye 13, at its outer end connected in a manner presently to be described. The chambers 4 and 5 in which the barbed portions of the hooks are mounted, are separated by a thin metal partition 6 to avoid entanglement of the hooks and ensure their operating in their proper slots. The other end or head portion of the bait is also recessed to form a chamber 7 between which and chambers 4 and 5 is a cam member 8 over which the barbed portion of the hooks are designed to ride when the shanks of the hooks are moved forward under a pull exerted on the line incident to the striking of the bait by a fish as shown in Fig. 4. This riding of the hooks on the cam causes their barbed portions to be projected for impaling the fish.

A chamber 9 extends longitudinally of the bait in rear of chamber 7 communicating with the latter and in which is mounted a coiled spring 20 secured at one end as shown at 21 to the bait body and at its other end 22 is connected with the eyes 13 of the two hooks 10 and 11 and also with an eye 24 of a lead line 23 which forms a connector between the spring and hooks and the main line, not shown.

A pin 25 extends transversely through the body of the bait above the rear end of the cam 8 and between which and said cam the hooks are designed to travel forming a guide for the hooks in their passage in and out of the body.

It will be obvious that the coiled spring 20 exerts its tension in a direction opposite to the tension of the line and operates to move the hooks longitudinally rearward into the position shown in Figs. 2 and 3, the pin 25 guiding them when so moving.

In the use of this bait when it is drawn through the water by casting or trolling and is struck by a fish the hooks slide naturally out of the body owing to the pull on the line and the riding of the hooks over the cam 8. Should the fish be a large one and crush the bait with its jaws control of the fish will still be had in view of the fact that the line is connected with the eyes of the hooks and unless the line breaks the fish will be held. The connection of the two hooks with the spring 20 and with the line and their mounting in the oppositely opening chambers 4 and 5 will allow the hooks to slide out in opposite directions at the same time and thus ensure impaling of the fish by at least one of them.

While this bait may be used for still fishing or trolling it is particularly designed for casting and when the bait is cast if the tension of the line should be sufficient to cause the hooks to move outward they will slide back under the tension of the spring 20 when the bait lights on the water owing to the reaction which occurs at this time.

Without further description it is thought that the features and advantages of the invention will be readily apparent to those skilled in the art, and it will of course be understood that changes in the form, proportion and minor details of construction may be resorted to, without departing from the spirit of the invention or its scope as claimed.

I claim:—

1. An artificial bait including a body having a slot therein and an axial opening communicating with said slot, a hook slidable in said body and adapted to move outwardly through said slot, a cam forming a part of said body and located in the path of said hook to project it through said slot when the hook moves in one direction, means for moving it in the opposite direction and retracting it into said body, and a lead line extending through said axial opening and attached directly to said hook.

2. An artificial bait having a body with slots therein, hooks housed in said slots, a coiled spring attached at one end to said hooks and at its other end to said body, means for projecting said hooks through said slots, and a lead line attached to the hook connected end of the spring, a cam forming a part of the body positioned to engage the shanks of said hooks when the latter are moved in one direction and thereby project the barbs of said hooks through the slots.

HENRY P. WIERSMA.